United States Patent
Otani et al.

(10) Patent No.: US 9,829,371 B2
(45) Date of Patent: Nov. 28, 2017

(54) INSTRUMENT DEVICE WITH A ROTATING NEEDLE AND CIRCUMFERENTIALLY ARRANGED PROJECTED SCALES

(71) Applicant: YAZAKI CORPORATION, Minato-ku, Tokyo (JP)

(72) Inventors: Akihiro Otani, Shizuoka (JP); Kouhei Takeshita, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 187 days.

(21) Appl. No.: 14/868,743

(22) Filed: Sep. 29, 2015

(65) Prior Publication Data
US 2016/0091360 A1 Mar. 31, 2016

(30) Foreign Application Priority Data
Sep. 30, 2014 (JP) ................................. 2014-200576

(51) Int. Cl.
G01D 13/04 (2006.01)
G01D 13/28 (2006.01)
G01G 23/32 (2006.01)

(52) U.S. Cl.
CPC ............ G01G 23/32 (2013.01); G01D 13/28 (2013.01); *G01D 13/04* (2013.01)

(58) Field of Classification Search
CPC ........ G01G 23/32; G01D 11/28; G01D 13/04; G01D 13/28
See application file for complete search history.

(56) References Cited

U.S. PATENT DOCUMENTS

| 4,975,807 A | * | 12/1990 | Ohashi | B60K 37/02 362/23.01 |
| 6,461,006 B1 | * | 10/2002 | Matumoto | G01D 11/28 362/23.16 |
| 7,374,323 B1 | * | 5/2008 | Kelman | G01D 11/28 116/286 |

(Continued)

FOREIGN PATENT DOCUMENTS

| EP | 3001150 B1 * | 2/2017 | ............. G01D 13/28 |
| JP | 2003-106873 A | 4/2003 | |

(Continued)

OTHER PUBLICATIONS

Communication dated Feb. 21, 2017 mailed from the Japanese Patent Office in corresponding Japanese Application No. 2014-200576.

(Continued)

*Primary Examiner* — Randy Gibson
(74) *Attorney, Agent, or Firm* — Sughrue Mion, PLLC (57) ABSTRACT

An instrument device includes multiple projected scales projected toward a viewing position side in an axial line direction of a rotation center axis of an indicating needle and arranged at intervals in a circumferential direction, a display board including an insertion portion by which each of the projected scales is projected, an annular portion which covers an outer radial direction portion from the viewing position side in each projected end surface arranged on the viewing position side in each of the projected scales, and a lighting device for emitting light to the projected scales. The projected scale includes a scale visible surface in an inner radial direction than the annular portion in the projected end surface. The annular portion includes grooves provided to each of the projected scales.

4 Claims, 8 Drawing Sheets

(56) References Cited

U.S. PATENT DOCUMENTS

| | | | | |
|---|---|---|---|---|
| 7,482,915 | B2* | 1/2009 | Sumiya | B60K 37/02 340/461 |
| 7,798,091 | B2* | 9/2010 | Suita | B60K 37/02 116/287 |
| 8,814,375 | B2* | 8/2014 | Makita | G01D 13/28 362/23.01 |
| 8,826,846 | B2* | 9/2014 | Hori | G01D 11/28 116/286 |
| 9,316,511 | B2* | 4/2016 | Mochizuki | G01D 11/28 |
| 9,664,541 | B2* | 5/2017 | Otani | G01D 11/28 |
| 2014/0261153 | A1 | 9/2014 | Mochizuki | |
| 2016/0091346 | A1* | 3/2016 | Otani | G01D 11/28 362/23.16 |

FOREIGN PATENT DOCUMENTS

| | | | | | |
|---|---|---|---|---|---|
| JP | 2006-126048 | A | | 5/2006 | |
| JP | 2007-33082 | A | | 2/2007 | |
| JP | 2008-116303 | A | | 5/2008 | |
| JP | 2011-013154 | A | | 1/2011 | |
| JP | 6063308 | B2 | * | 3/2013 | ............ G01D 13/28 |
| JP | 2014-178279 | A | | 9/2014 | |
| JP | 6018147 | B2 | * | 11/2016 | ............ G01D 13/28 |

OTHER PUBLICATIONS

Communication dated Dec. 13, 2016 from the Japanese Patent Office in counterpart Application No. 2014-200576.

Communication dated Aug. 15, 2017, from Japanese Patent Office in counterpart application No. 2014-200576.

* cited by examiner

INSTRUMENT DEVICE WITH A ROTATING NEEDLE AND CIRCUMFERENTIALLY ARRANGED PROJECTED SCALES

CROSS-REFERENCE TO RELATED APPLICATION(S)

The present application claims priority to and incorporates by reference the entire contents of Japanese Patent Application No. 2014-200576 filed in Japan on Sep. 30, 2014.

BACKGROUND OF THE INVENTION

1. Field of the Invention

The present invention relates to an instrument device.

2. Description of the Related Art

Conventionally, an instrument device is known which visibly indicates measurement results to a user. For example, such an instrument device is provided in a cabin of a vehicle, and indicates measurement results of such as a vehicle speed and a rotation speed of a power source. Such a vehicle instrument device is required not only to indicate measurement results, but also to improve appearance related to merchantability and visibility. For example, in an instrument device described in Japanese Patent No. 4671099, multiple three-dimensional light transmission bodies are arranged on a display board, and the transmission bodies are accommodated in an accommodating section formed with a cylindrical member surrounding an operating range of an indicating needle on a front side of the display board. Since a part of the transmission bodies is projected from the accommodating section, a three-dimensional structure of the transmission body is conspicuous, and appearance with a three-dimensional effect is realized. Further, the instrument device described in Japanese Patent No. 4462138 includes multiple projected portions and an annular decorating portion. The multiple projected portions are scales formed at intervals in a circumferential direction on a viewing side front surface of a display board (design board). The annular decorating portion is arranged at an outer peripheral edge on a viewing side front surface of the display board. The projected portion is accommodated in a groove cut toward an outer radial direction side from an inner peripheral edge in the decorating portion. An inclined portion different from at least either of an upper surface of the projected portion or a bottom surface of a groove is provided on a viewing side front surface near at least the projected portion of the decorating portion. In this instrument device, a projected portion and a background thereof are clearly distinguished by such a configuration, and visibility of the projected portion is improved.

SUMMARY OF THE INVENTION

An instrument device can be improved in the aspect of appearance. An object of the present invention is to provide an instrument device having an excellent appearance.

In order to achieve the above mentioned object, an instrument device according to one aspect of the present invention includes multiple projected scales configured to be indicated by an indicating needle which rotates in response to measurement results, projected toward a viewing position side in an axial line direction of a rotation center axis of the indicating needle, and arranged at intervals in a circumferential direction around the rotation center axis; a plate member configured to include insertion portions provided to each of the projected scales such that each of the projected scales projects toward the viewing position side; an annular portion configured to cover, from the viewing point side, an outer side portion in a radial direction around the rotation center axis in each projected end surface on the viewing position side in each of the projected scales; and a lighting device configured to emit light to the projected scales, wherein the projected scales include scale visible surfaces on an inner side in the radial direction than the annular portion on the projected end surfaces, the annular portion includes grooves provided to each of the projected scales, each of the grooves being an area to accommodate an outer portion in the radial direction of the projected scales and visible from the viewing position side, and a width in the circumferential direction of a portion visible in the grooves is equal to or larger than a width in the circumferential direction of the insertion portion.

Herein, it is desirable that when viewed from a viewing position side, an outer peripheral edge line of the scale visible surface is coincide with an inner peripheral edge line of an annular visible surface on the viewing point side in the annular portion, and the projected scale includes a connecting surface which is connected to the scale visible surface in an outer radial direction than an inner peripheral edge line of the annular visible surface and in which a direction and an angle of inclination of the connecting surface are the same as those of the scale visible surface.

Further, it is desirable that a shape of the insertion portion viewed in the axial line direction is coincide with a shape of the projected scale viewed in the axial line direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an instrument device according to the present invention will be described in detail based on drawings. The present invention is not limited by the embodiment.

EMBODIMENT

One embodiment of an instrument device according to the present invention will be described with reference to FIGS. 1 to 9.

Figure 1:
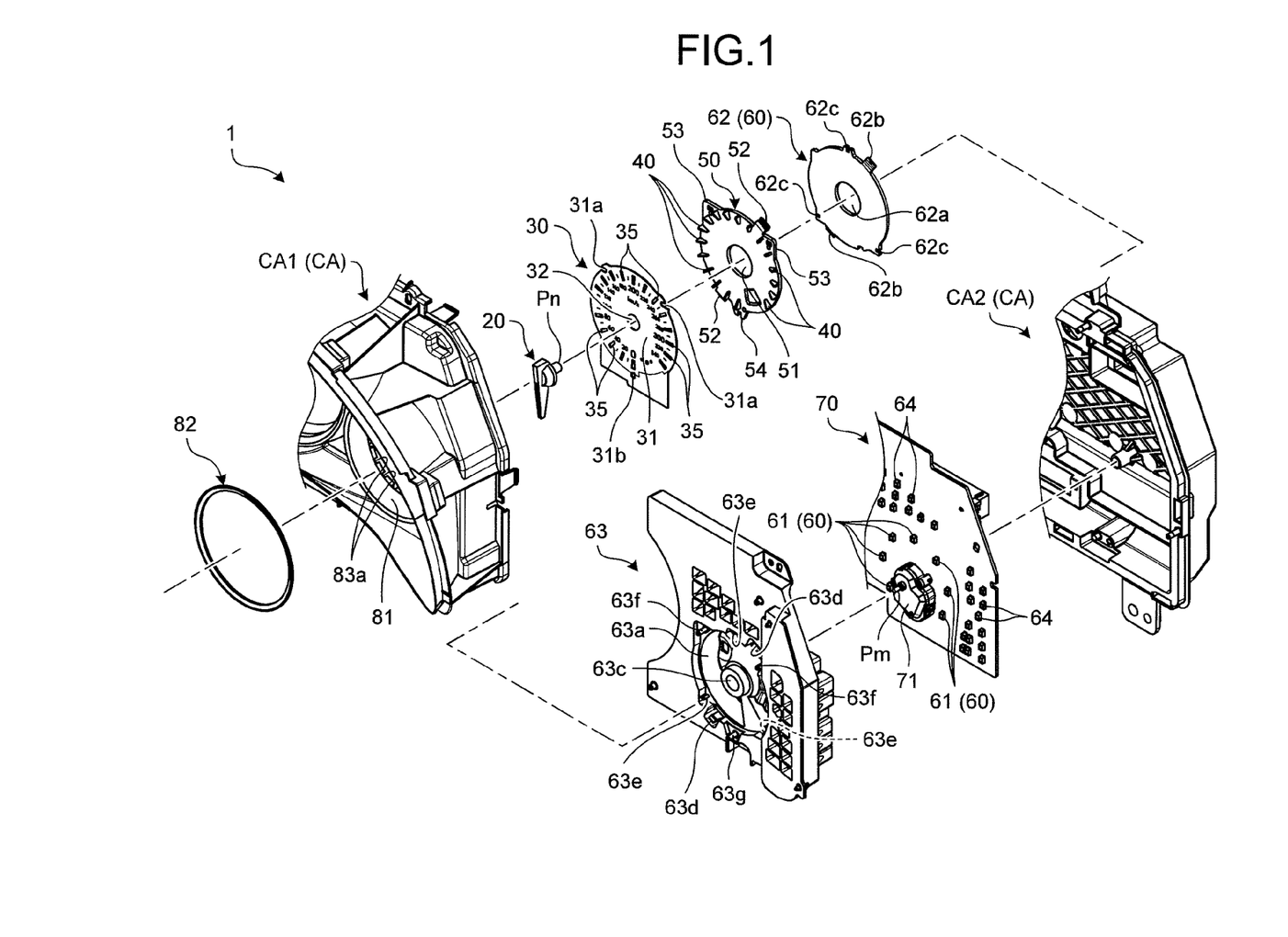
FIG. 1 is an exploded perspective view of a vehicle instrument device according to an embodiment.

In the embodiment, a vehicle instrument device provided in a cabin of a vehicle is illustrated as an example of an instrument device. For example, a vehicle instrument device 1 is arranged in an instrument panel or on a dashboard. A reference sign 1 in FIG. 1 indicates an example of the vehicle instrument device. FIG. 1 is an exploded perspective view illustrating each configuration in the vehicle instrument device 1. FIG. 1 illustrates only a main portion in each configuration for convenience in illustration. Further, a first case member CA1, a second case member CA2, an intermediate case 63, and a substrate 70 are partially illustrated in FIG. 1 for convenience in illustration.

Figure 2:
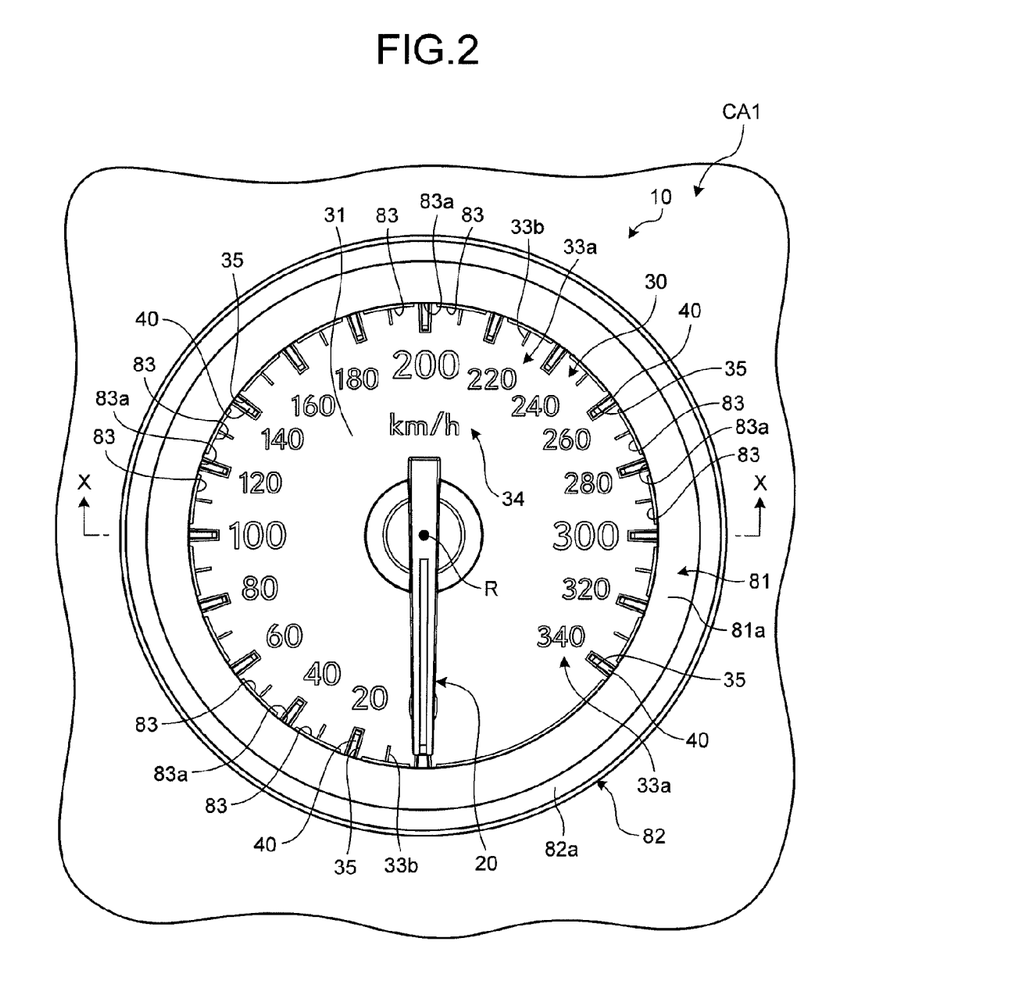
FIG. 2 is a front view of an instrument according to the embodiment.

The vehicle instrument device 1 includes at least one instrument 10 and an accommodating member (case CA) for accommodating and fixing the instrument 10 inside. The illustrated vehicle instrument device 1 according to the example includes multiple types of the instruments 10 in the case CA to indicate measurement results including vehicle information. For convenience of description, one instrument 10 illustrated in FIG. 2 is described as an example. In this example, a speed indicator displaying a vehicle speed as a measurement result is illustrated as a specific example of the instrument 10. However, the instrument 10 according to the embodiment to be described in detail below can be applied to other instruments which measure different objects. Examples of the other instruments include a rotation meter, which indicates a rotation speed of a power source (for example, an engine of an internal combustion engine) as a measurement result, and a power meter, which indicates power consumption of an electric vehicle and the like as a measurement result. Although not illustrated, in the vehicle instrument devices 1, various information is displayed by, other than the instrument 10, such as a display area for indicating information on a vehicle state such as a warning lamp, a display area for indicating a traveling condition of a vehicle, and a display area for indicating simple guide information in the car navigation system.

As illustrated in FIG. 1, the instrument 10 includes an indicating needle 20, a display board 30, a projected scale 40, a light guide body 50, a lighting device 60, and a substrate 70.

As illustrated in FIGS. 1 and 2, the indicating needle 20 is a needle rotated by a driving unit (illustration omitted) in accordance with measurement results. The indicating needle 20 according to the example rotates in response to a detection signal from a vehicle speed detector (illustration omitted) including such as a vehicle speed sensor and a wheel speed sensor. This indicating needle 20 may be a molding of one needle member or may be an assembly of multiple members. For example, in the case where the indicating needle 20 includes multiple members, a decoration process is applied to a front surface of a member arranged on a back side (a side opposite to a cabin inside) by such as a hot stamp, and a color of the decorative layer may be viewed from a cabin inside.

Figure 3:
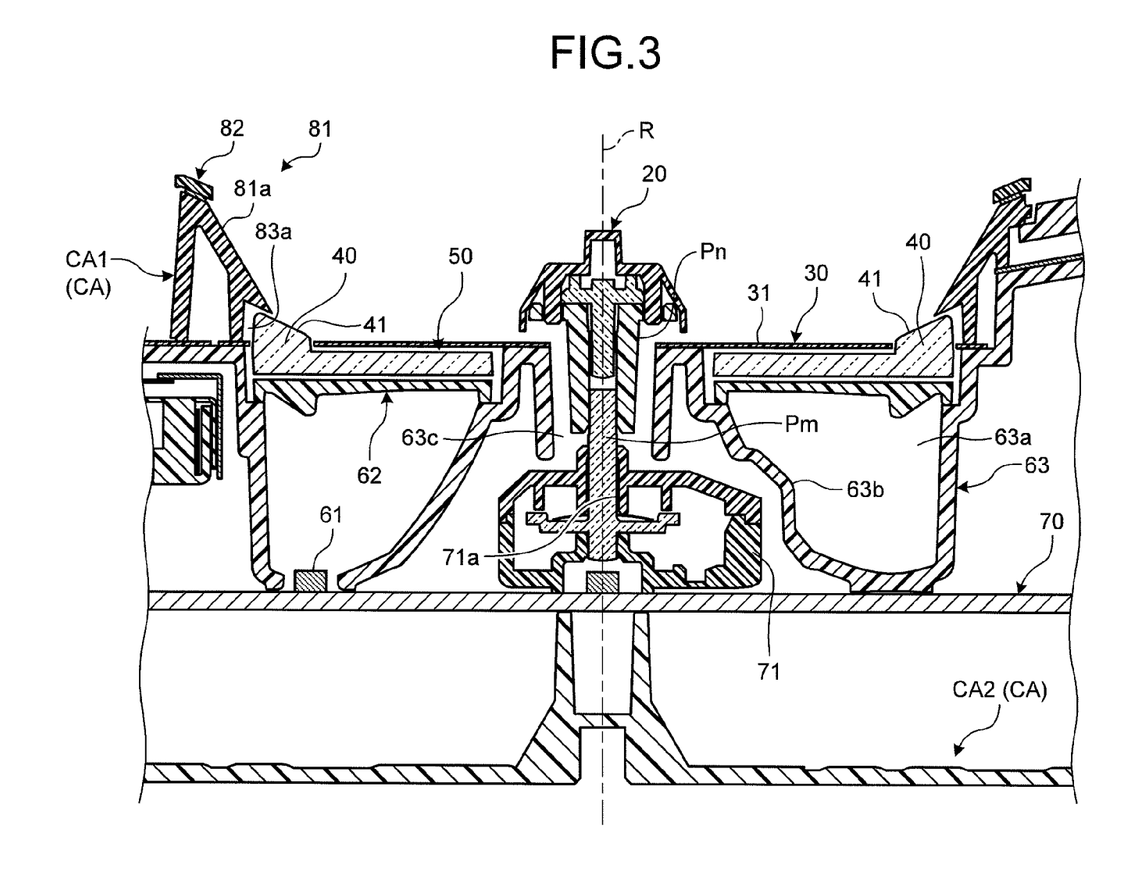
FIG. 3 is a sectional view of an instrument cut along an X-X line in FIG. 2.

A driving unit of the indicating needle 20 includes a rotator (not illustrated) (at least operable as an electric motor) and a rotation axis Pm connected to an output axis of the rotator via such as a gear group (illustration omitted). For example, this driving unit is accommodated in an accommodating section 71 formed on the substrate 70 from a second case member CA2 side, to be described later, and fixed to the case CA via the substrate 70. The rotation axis Pm is extended to the side of a driver who is an viewer of the instrument 10 (specifically, a side where the viewer is positioned (hereinafter called a viewing position side) and inside a cabin) via a through hole 71a (FIG. 3) of the accommodating section 71. A rotation axis Pn of the indicating needle 20 is connected to the rotation axis Pm. An extending direction of the rotation axis Pn is coincide with an axial line direction of the rotation axis Pm. The driving unit rotates the indicating needle 20 together with the rotation axis Pm to a position in response to a measurement result (measured vehicle speed) by rotating the rotation axis Pm in response to a detection signal from a vehicle speed detector. A driving circuit of each unit of such as the instrument 10 in the vehicle instrument device 1 is formed on the substrate 70. Electrical power from a power source (illustration omitted) is supplied to the driving circuit. In FIG. 3, a needle portion of the indicating needle 20 is omitted for convenience in illustration.

Hereinafter, unless specifically mentioned, a direction along a rotation center axis R (the rotation axis Pn) of the indicating needle 20 is called an axial line direction, and a direction around the rotation center axis R of the indicating needle 20 is called a circumferential direction. Further, regarding the axial line direction, a driver side, which is a viewer side, is called a front (a cabin inside which is the viewing position side), and a direction opposite to the driver side (a cabin inside) is a back. Therefore, hereinafter, a driver side (a cabin inside) across an object is defined as a front or a surface, and a side opposite to the driver side (cabin inside) across the object is defined as a rear or a back. Further, a direction orthogonal to the rotation center axis R of the indicating needle 20 is called a radial direction. More specifically, an inward side is called an inner radial direction, and an outward side is called an outer radial direction. Further, hereinafter, among outlines expressing a circle, a line on an inner peripheral edge side on the inner radial direction is called an inner peripheral edge line, and a line on an outer peripheral edge side on the outer radial direction is called an outer peripheral edge line. Furthermore, the inner peripheral edge line includes a line on the inner radial direction among outlines expressing a member and a portion arranged around the rotation center axis R of the indicating needle 20. The outer peripheral edge line includes a line on the outer radial direction among outlines expressing the member and the portion.

The indicating needle 20 may display an image on a display portion (illustration omitted) of such as a liquid crystal display.

The display board 30 displays index parts pointed by the indicating needle 20 to a viewer. The index parts are provided at a main portion 31 formed in a disc shape. A concentric through hole 32 is formed at a center of the disc-shaped main portion 31. The rotation axis Pn of the indicating needle 20 is inserted into the through hole 32 from a front side. Therefore, centers of the main portion 31 and the through hole 32 are preferably positioned on the rotation center axis R of the indicating needle 20.

An index part indicates measurement results. The index part includes a first index part 33a, which indicates measurement results by figures and letters, and a second index part 33b, which indicates measurement results by a scale (for example, a linear, rectangular, or trapezoidal scale). As illustrated in FIG. 2, the display board 30 according to the example is a dial plate including the first index part 33a which indicates a vehicle speed by figures, and the second index part 33b which indicates a vehicle speed by a scale. A plurality of the first index parts 33a and the second index parts 33b is provided at intervals each in the circumferential direction around the rotation center axis R of the indicating needle 20. The first index parts 33a and the second index parts 33b according to the example are arranged at equal intervals in the circumferential direction. Further, in this example, a letter information portion 34 which displays letter information such as "km/h" is also provided on a front surface of the display board 30.

For example, this display board 30 can be molded with a polymer material such as a synthetic resin which does not transmit light. In this case, the index parts (the first index parts 33a and the second index parts 33b) and the letter information portion 34 can be printed on a front surface (an index part display surface) of the display board 30 in a desired color. This display board 30 can be molded by a material which transmits light (hereinafter called a light transmissive material). The light transmissive material is a transparent or a translucent material (for example, a polymer material such as a synthetic resin). In this case, for example, shapes of the index parts and the letter information portion 34 are punched and printed on a front surface of the display board 30, which is formed of a transparent material, by a dark color ink such as black and dark blue ink. Accordingly, light emitted from the light guide body 50 arranged on a back side of the display board 30 to be described later transmits the punched portions, and a viewer can recognize information of the index parts and the letter information portion 34.

The projected scale 40 is a scale indicated by the indicating needle 20 and a three-dimensional scale projected forward (a viewer side). Multiple projected scales 40 are arranged in a front side of the display board 30 at intervals in the circumferential direction. The projected scales 40 indicate measurement results (a vehicle speed) in the same way as the second index parts 33b on the display board 30 and are arranged at equal intervals in the circumferential direction. The projected scales 40 and the second index parts 33b are, as illustrated in FIG. 2, alternatively arranged in the circumferential direction. In this example, the projected scales 40 and the first index parts 33a on the display board 30 are paired one by one, and each of the pairs indicates the same measurement result (a vehicle speed).

The projected scale 40 is molded by a light transmissive material. However, in the case where the projected scale 40 is visible without being illuminated by the lighting device 60 arranged on a rear side, which will be described later, the projected scale 40 does not necessarily have a light transmission property and may be formed by a material enabling the identification of a periphery (such as the display board 30) and applied by a paint or an ink of a color enabling the identification of the periphery.

Figure 4:
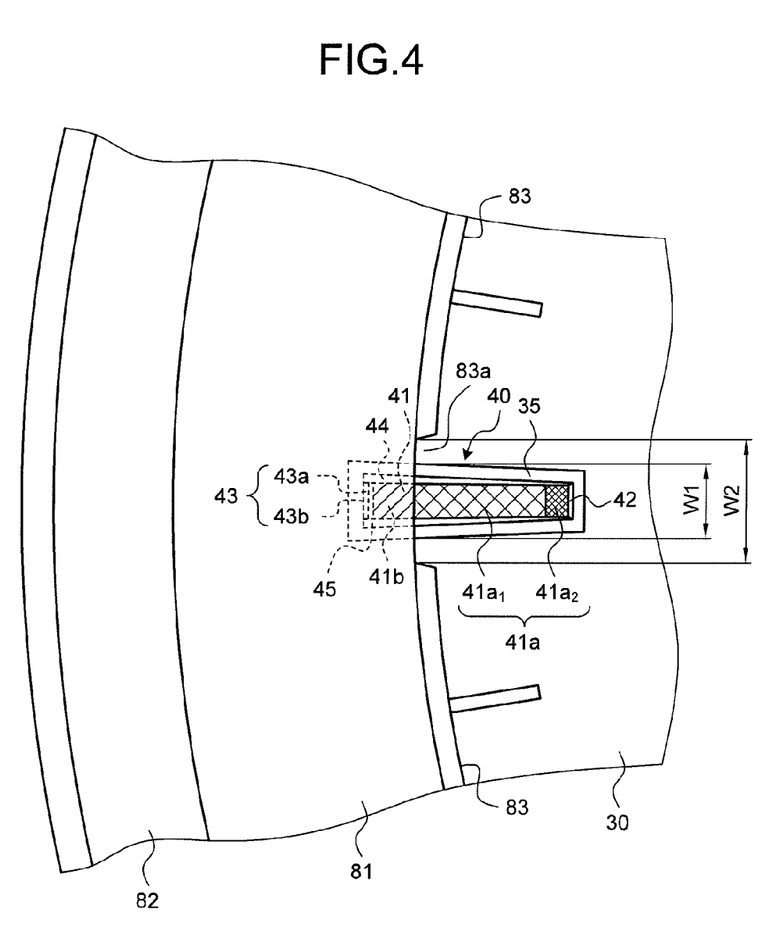
FIG. 4 is an enlarged view of a periphery of a projected scale illustrated in FIG. 2.
Figure 5:
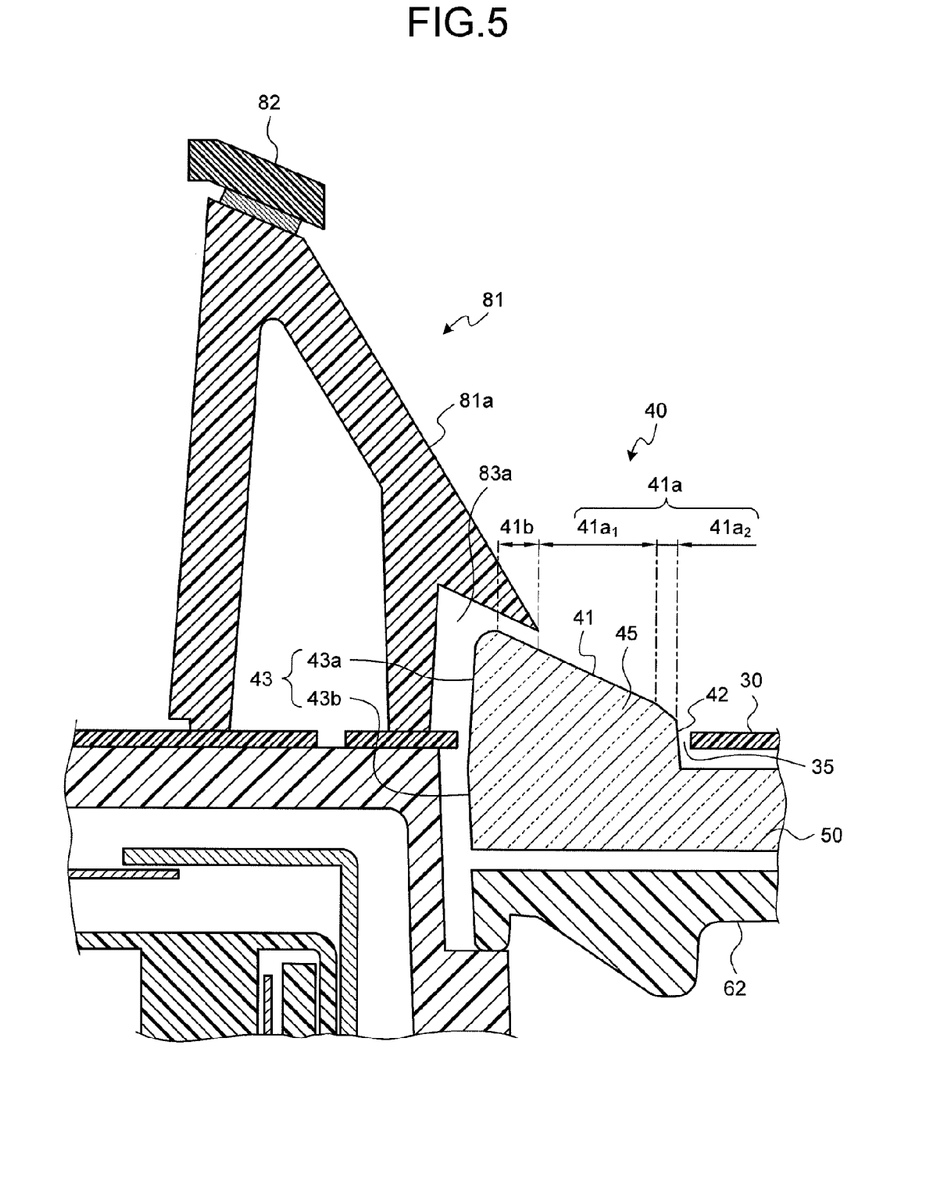
FIG. 5 is an enlarged view of a periphery of a projected scale illustrated in FIG. 3.

All of the projected scales 40 are formed in the same shape in the example. However, a different shape may be mixed. The projected scale 40 includes an end surface (a front surface, and hereinafter called "a projected end surface") 41 in a projecting direction as illustrated in FIGS. 4 and 5. FIG. 4 is an enlarged view of the projected scale 40 illustrated in FIG. 2. FIG. 5 is an enlarged view of the projected scale 40 illustrated in FIG. 3. The projected end surface 41 may be formed by one plane, and may be formed by a combination of multiple planes or a combination of at least one plane and one curved surface. However, a scale visible surface 41a in the projected end surface 41 includes one or multiple planes. Two cross-hatched portions in FIG. 4 are for convenience in illustration to describe regions of the scale visible surface 41a. Further, a hatching indicated by the reference sign 41b is also for convenience in illustration to describe a region of a connecting surface 41b to be described later.

In the projected end surface 41, the scale visible surface 41a is a region which is visible by a viewer after assembled as the vehicle instrument device 1 and a region on an inner radial direction than an annular portion (an annular facing) 81, which will be described later, in the projected end surface 41. This scale visible surface 41a includes one inclined surface in which a projection amount decreases toward the inner radial direction or a composite inclined surface in which the multiple inclined surfaces having different inclinations are connected in a radial direction. In the case where the scale visible surface 41a includes one inclined surface, the scale visible surface 41a is formed in, for example, a trapezoidal shape in which the inner radial direction is an upper bottom, a rectangular shape extending in a radial direction, or an isosceles triangle shape in which the outer radial direction is a base. In the case where the scale visible surface 41a includes multiple inclined surfaces, in the scale visible surface 41a, for example, an inclined surface arranged at the most inner radial direction is similarly formed in a trapezoidal shape, a rectangular shape, or a isosceles triangle shape, and the other inclined surfaces are similarly formed in a trapezoidal shape or a rectangular shape.

Specifically, the scale visible surface 41a according to the example includes a first inclined surface $41a_1$ and a second inclined surface $41a_2$. In the first inclined surface $41a_1$, a projection amount decreases toward the inner radial direction from an inner peripheral edge line of the annular visible surface 81a (a facing visible surface 81a of a facing 81) of an annular portion 81 to be described later, as a starting point. In the second inclined surface $41a_2$, a projection amount decreases toward the inner radial direction from an end portion in the inner radial direction of the first inclined surface $41a_1$ as a starting point. For example, on a basis of a plane orthogonal to the axial line direction, an angle of inclination of the second inclined surface $41a_2$ according to the example is larger than that of the first inclined surface $41a_1$. Here, the projected scale 40 according to the example includes a connecting surface 41b on the outer radial direction than an inner peripheral edge line of the annular visible surface 81a. The connecting surface 41b is connected to the scale visible surface 41a, and a direction and an angle of inclination thereof are the same as those of the scale visible surface 41a. Specifically, the connecting surface 41b, in which a direction and an angle of inclination are the same as those of the first inclined surface $41a_1$, is connected to the first inclined surface $41a_1$ on the outer radial direction than the inner peripheral edge line of the annular visible surface 81a. The first inclined surface $41a_1$ is formed in the above-described trapezoidal shape. According to the embodiment, the connecting surface 41b is extended to an end portion on the outer radial direction in the projected end surface 41, and the projected end surface 41 is formed in a trapezoidal shape which is the same shape as the first inclined surface $41a_1$. Further, the second inclined surface $41a_2$ is formed in the above-described trapezoidal shape with the upper bottom of the first inclined surface $41a_1$ as a lower bottom thereof. Each of the first inclined surface $41a_1$ and the second inclined surface $41a_2$ is formed in an isosceles trapezoidal shape, and ratios of an upper bottom and a lower bottom to a height are equal. Specifically, in the example, in the case where the scale visible surface 41a and the projected end surface 41 are viewed from a front side, these are viewed in the same isosceles trapezoid shapes having different ratios.

Here, in consideration of appearance improvement, a boundary between the first inclined surface $41a_1$ and the second inclined surface $41a_2$ is preferably made inconspicuous. Therefore, for example, in the scale visible surface 41a, the second inclined surface $41a_2$ may be formed only at an end portion of the inner radial direction in the scale visible surface 41a. In other words, the second inclined surface 41a₂ may be formed by chamfering between the first inclined surface 41a₁ and a first wall surface 42 to be described later. Further, the scale visible surface 41a may be formed so as to connect the first inclined surface 41a₁ and the second inclined surface 41a₂ on a curbed surface.

Furthermore, the projected scale 40 is a surface erected forward and includes multiple wall surfaces connecting to each outline on the projected end surface 41. The wall surface includes the first wall surface 42 on the inner radial direction, a second wall surface 43 on the outer radial direction, a third wall surface (wall surface arranged in a clockwise direction when viewed from a front side) 44 on one side in the circumferential direction, and a fourth wall surface (wall surface arranged in a counterclockwise direction when viewed from the front side) 45 on the other side in the circumferential direction.

Here, the first wall surface 42 according to the example is an inclined surface in which the projected end surface 41 side with respect to the axial line direction is slightly inclined in the outer radial direction. Further, the second wall surface 43 includes a first inclined surface 43a and a second inclined surface 43b. In the first inclined surface 43a, the projected end surface 41 side with respect to the axial line direction is slightly inclined in the inner radial direction. In the second inclined surface 43b, a back surface side of the light guide body 50 with respect to the axial line direction is slightly inclined to the inner radial direction. The third wall surface 44 is an inclined surface in which the projected end surface 41 side with respect to the axial line direction is slightly inclined in a counterclockwise direction. The fourth wall surface 45 is an inclined surface in which the projected end surface 41 side with respect to the axial line direction is slightly inclined in a clockwise direction. To improve appearance, each of the first to fourth wall surfaces 42 to 45 is erected in a virtual space in which the scale visible surface 41a is projected in the axial line direction. However, the projected scale 40 is integrally formed with the light guide body 50 as described later. In consideration of punching workability, for example, in the axial line direction from a molding die, the first to fourth wall surfaces 42 to 45 are preferably inclined in accordance with the example. Therefore, the angle of the inclinations with respect to the axial line direction of the first to fourth wall surfaces 42 to 45 are minimized within a range not impairing the punching workability. Accordingly, the projected scale 40 can prevent deterioration in appearance while securing the punching workability.

The first wall surface 42 is an erected surface connected to an upper bottom of the second inclined surface 41a₂ on an outline of the projected end surface 41. The first wall surface 42 preferably includes one plane or curved surface since a projection amount is small.

The second wall surface 43 is arranged behind the annular portion (annular facing) 81 and is not visible when assembled as the vehicle instrument device 1. Therefore, the second wall surface 43 can be formed in any shape as long as the punching workability is secured.

The third and fourth wall surfaces 44 and 45 may be formed as one plane, and may be formed by combining multiple planes or combining at least one plane and one curved surface. The third wall surface 44 is an erected surface connected to a portion corresponding to the one side leg on an outline of the projected end surface 41. The third wall surface 44 is an erected surface connected to a portion corresponding to one side leg on the outline of the scale visible surface 41a. The erected surface is one plane connected to the one side leg of the first inclined surface 41a₁ and the one side leg of the second inclined surface 41a₂. The fourth wall surface 45 is an erected surface connected to a portion corresponding to the other side leg on an outline of the projected end surface 41. The fourth wall surface 45 is an erected surface connected to a portion corresponding to the other side leg on an outline of the scale visible surface 41a. The erected surface is one plane connected to the other side leg of the first inclined surface 41a₁ and the other side leg of the second inclined surface 41a₂. In the example, each of the third wall surface 44 and the fourth wall surface 45 are formed by one plane by extending an erected surface connected to the scale visible surface 41a in the outer radial direction.

The light guide body 50 is a plate prism molded by a light transmissive material. A main portion of the light guide body 50 is formed in a disc shape of which diameter is the same as that of the display board 30. The light guide body 50 is arranged on a back side of the display board 30. A concentric through hole 51 is formed at a center of the light guide body 50. The rotation axis Pn of the indicating needle 20 is inserted into the through hole 51 from a front side. Therefore, the main portion of the light guide body 50 and the center of the through hole 51 are preferably positioned on the rotation center axis R of the indicating needle 20.

According to the example, the projected scale 40 and the light guide body 50 are integrally molded. The projected scale 40 is projected forward from an outer peripheral edge on a front surface of the light guide body 50. Therefore, insertion portions 35 of the projected scales 40 are formed at an outer peripheral edge of the display board 30 so as to be corresponded to each of the projected scales 40. Specifically, the display board 30 is a plate member in which the insertion portions 35, by which each projected scale 40 is projected toward a viewer side, are provided to each projected scale 40. The insertion portion 35 is a portion to cause the projected scale 40 to project to a viewer side from a front surface of the display board 30. Each interval between the insertion portions 35 and each wall surface (the first to fourth wall surfaces 42 to 45) of the projected scale 40 is preferably narrowed to improve appearance within a range in which each projected scale 40 can be inserted. As this insertion portion 35, for example, a through hole or a grove in which the inner radial direction is a bottom may be formed.

The lighting device 60 is for transmitting light to the projected scale 40 having a light transmission property and the display board 30 formed by a light transmissive material (specifically, index parts having a light transmission property (the first index part 33a and the second index part 33b) and the letter information portion 34). Specifically, the lighting device 60 described herein is prepared in the case where the projected scale 40 and the index parts and the letter information portion 34 of the display board 30 have a light transmission property. Examples of this lighting device 60 include a device which emits light toward a back side of the light guide body 50 and a device which emits light toward the outer radial direction of the light guide body 50 and the projected scale 40. In the example, the lighting device 60 is arranged on a back side of the light guide body 50 and emits light toward to the back side of the light guide body 50.

This lighting device 60 includes a light source 61 and a diffusion board 62. In the lighting device 60, the diffusion board 62 is arranged on a back side of the light guide body 50, and the light source 61 is arranged on a back side of the diffusion board 62. Specifically, in this lighting device 60, emission light from the light source 61 is emitted toward a back surface of the diffusion board 62, and incident light transmitted through the diffusion board 62 is emitted toward a back surface of the light guide body 50. In this lighting device 60, the intermediate case 63 is arranged between the light source 61 and the diffusion board 62.

One or multiple light sources 61 are arranged in accordance with its form. The light source 61 according to this example is, for example, light-emitting diode (LED) which emits light-colored light such as white light, red light, blue light, and green light. The multiple light sources 61 are arranged on the substrate 70 at intervals in the circumferential direction in accordance with an arrangement of the projected scales 40 and index parts of the display board 30. Further, the light source 61 is provided in accordance with an arrangement of the letter information portion 34 of the display board 30. The light source 61 stops when an ignition is turned off and stops light emission (the light source is turned off), and the light source 61 operates when an ignition is turned on and emits light (the light source is turned on).

The diffusion board 62 decreases and diffuses incident light from the light source 61, and emits the decreased and diffused light toward a back surface of the light guide body 50. This diffusion board 62 is molded with a light transmissive material. Further, a main portion of this diffusion board 62 is molded in a disc shape of which diameter is the same as those of the display board 30 and the light guide body 50. A concentric through hole 62a is formed at a center of this diffusion board 62. The rotation axis Pn of the indicating needle 20 is inserted into the through hole 62a from a front side. Therefore, the main portion of this diffusion board 62 and the center of the through hole 62a are preferably arranged on the rotation center axis R of the indicating needle 20.

The intermediate case 63 has a function to accommodate the light guide body 50 and the diffusion board 62 and also has a function as a telltale case which guides light from a light source 64 to a warning lamp (not illustrated). This intermediate case 63 is molded by a polymer material such as a synthetic resin. A round accommodating section 63a to accommodate the light guide body 50 and the diffusion board 62 is formed in this intermediate case 63. A conical portion 63b, of which diameter increases toward a front side, is formed inside of the accommodating section 63a. A center of the conical portion 63b is coincide with the rotation center axis R of the indicating needle 20. A concentric through hole 63c is formed at the center of a front end surface of the conical portion 63b. The rotation axis Pn of the indicating needle 20 is inserted into a through hole 63c from a front side. Therefore, a center of the through hole 63c is preferably arranged on the rotation center axis R of the indicating needle 20.

This instrument 10 is accommodated in the case CA as illustrated in FIG. 3, and forms a part of the vehicle instrument device 1 by being fixed to the inside of the case CA. The case CA includes the first case member CA1 arranged on a front side and the second case member CA2 arranged on a back side. The first case member CA1 and the second case member CA2 are fixed each other by a lock mechanism of such as a claw and a screw member. The instrument 10 is arranged in an internal space formed by the first case member CA1 and the second case member CA2 in a state in which the instrument 10 is sandwiched between the first case member CA1 and the second case member CA2.

For example, the substrate 70 is arranged from a front side to the second case member CA2 and fixed by a lock mechanism of such as a craw and a screw member. The intermediate case 63 is arranged from a front side to the second case member CA2 so as to cover the substrate 70 and fixed by a lock mechanism of such as a craw and a screw member.

The diffusion board 62 and the light guide body 50 are accommodated in the accommodating section 63a of the intermediate case 63 in the order. Here, an engaging claw 62b, a forked positioning claw 62c are formed at an outer peripheral edge of the main portion of the diffusion board 62. Further, an engaging claw 52, a positioning hole 53, and a forked positioning claw 54 are formed at an outer peripheral edge of the main portion of the light guide body 50. Each of the engaging claws 62b and 52 are engaged with an engaging recess 63d in the accommodating section 63a. The accommodating section 63a holds the diffusion board 62 and the light guide body 50. On the other hand, a groove portion of the positioning claw 62c is engaged with a positioning projection 63e of the accommodating section 63a, and the positioning claw 62c positions the diffusion board 62 to a predetermined position in the accommodating section 63a. Further, the light guide body 50 is positioned at a predetermined position in the accommodating section 63a by engaging the positioning hole 53 with a positioning projection 63f of the accommodating section 63a and engaging a groove portion of the positioning claw 54 with a positioning projection 63g of the accommodating section 63a.

The display board 30 is arranged so as to cover the light guide body 50 from a front side. A positioning groove 31a and a positioning hole 31b are formed at an outer peripheral edge of the main portion 31 of the display board 30. Here, the above positioning projections 63f and 63g are projected forward from a front surface around the accommodating section 63a of the intermediate case 63. Therefore, the positioning groove 31a is engaged with the positioning projection 63f, and the positioning hole 31b is engaged with the positioning projection 63g. Accordingly, the display board 30 can be positioned at a predetermined position on a front surface of the intermediate case 63.

The first case member CA1 is fixed to the second case member CA2 in a state in which the display board 30 is attached to the intermediate case 63.

The indicating needle 20 inserts the rotation axis Pn to each through hole 32, 51, 62a, and 63c from a front side of the display board 30, and connects to the rotation axis Pm of a driving unit. This indicating needle 20 may connect to the rotation axis Pm after the first case member CA1 and the second case member CA2 have been fixed, or may be connected to the rotation axis Pm before the first case member CA1 and the second case member CA2 are fixed.

Here, the annular portion 81 is provided to the vehicle instrument device 1 to cover an outer peripheral edge of the instrument 10 from a front side. The annular portion 81 covers an outer peripheral edge of the display board 30 and an outer radial direction portion of each projected scale 40 from a front side, and the annular portion 81 is annularly formed. Therefore, the display board 30, a portion which is not covered from a front side by the annular portion 81 in the projected scale 40, and the indicating needle 20 are exposed on the inside of a cabin from an opening in the inner radial direction of the annular portion 81. Specifically, in the display board 30, an inner radial direction portion is more exposed than an outer peripheral edge covered from a front side by the annular portion 81, and therefore, the index parts (the first index part 33a and the second index part 33b) and the letter information portion 34 are exposed on the inside of a cabin. Further, in the projected scale 40, for example, the scale visible surface 41a which is not covered from a front side by the annular portion 81 is exposed on the inside of a cabin.

The annular portion 81 includes an annular surface (hereinafter called "an annular visible surface") 81a which is visible by a viewer from a front side. The annular visible surface 81a is formed as one annular inclined surface inclined in the same direction as the scale visible surface 41a. Specifically, the annular visible surface 81a is an annular inclined surface, for example, in which the projection amount toward a front side from a front surface of the display board 30 decreases toward the inner radial direction. For example, on a basis of a plane orthogonal to the axial line direction, an angle of inclination of the annular visible surface 81a according to the example is larger than that of the scale visible surface 41a.

More specifically, the annular portion 81 may be formed as an annular facing integrally molded with the case CA (first case member CA1), or may be formed as an annular member separate from the case CA (first case member CA1). In the latter case, for example, the annular member is fitted and fixed to the first case member CA1. In the example, as such the annular portion 81, the above-described facing 81 is provided.

In this manner, in the vehicle instrument device 1, the scale visible surface 41a of each projected scale 40 and the annular visible surface 81a of the annular portion 81 (the facing visible surface 81a of the facing 81) are inclined in the same direction. Therefore, each of the projected scales 40 and the annular portion 81 are further integrated, and an appearance of the vehicle instrument device 1 is improved. Especially, in the vehicle instrument device 1, when viewed from a viewer side, the annular visible surface 81a of the annular portion 81 covers an outer radial direction portion of each projected scale 40 from a front side. Accordingly, an outer peripheral edge line of the scale visible surface 41a of each projected scale 40 and an inner peripheral edge line of the annular visible surface 81a become coincide, and therefore, a boundary, a step, and a gap are reduced as much as possible between the scale visible surface 41a of each projected scale 40 and the annular visible surface 81a, and each projected scale 40 and the annular portion 81 are further integrated and an appearance can be further improved.

Here, for example, each of the display board 30, the projected scale 40, and the light guide body 50 is molded by a light transmissive material of dark color such as black and dark blue. Further, herein, for example, the above-described color printing of dark color is provided on a front surface of the display board 30 molded by a transparent material, and the projected scale 40 and the light guide body 50 may be molded by a light transmissive material of dark color. By forming in this manner, when the light source is turned off, the projected scale 40 is seen in black by reflected light of external light entered to the projected scale 40 from a front side. Therefore, when the light source is turned off, a real image of the projected scale 40 is hardly seen. On the other hand, when the light source is turned on, emitted light from the light source 61 enters to the light guide body 50 via the diffusion board 62, and the incident light transmits through the projected scale 40. Accordingly, the projected scale 40 is illuminated. Therefore, when the light source 61 is turned on from off, the projected scale 40 can be clearly visually recognized, and therefore appearance is improved as well as the visibility of the projected scale 40 is improved. Thus, in the vehicle instrument device 1, appearance of the projected scale 40 can be improved when the light source is turned on and when the light source is turned off.

When the light source is turned on, index parts of the display board 30 of the instrument 10 (the first index part 33a and the second index part 33b), the letter information portion 34, and the projected scales 40 are seen in the color of light emitted from the lighting device 60. Specifically, the index parts of the display board 30, the letter information portion 34, and the projected scale 40 are seen in the color in response to combination of the color of light emitted from the light source 61 and the color of the diffusion board 62 when the light source is turned on. Therefore, a desired color of the index parts of the display board 30, the letter information portion 34, and the projected scales 40 when the light source is turned on can be realized by changing the combination. For example, herein, the light source 61 emits white light, and the diffusion board 62 is molded by a white translucent material. In this manner, when the light source is turned on, the index parts of the display board 30, the letter information portion 34, and the projected scales 40 looks shining in white. Further, the desired color, for example, may be realized by arranging a colored light transmission member such as a film in the desired color between the light guide body 50 and the diffusion board 62 and between the display board 30 and the light guide body 50. For example, the index part of the display board 30 looks shining in orange when the light source is turned on, by arranging an orange film between the index part and the light guide body 50.

Further, in the vehicle instrument device 1, at least the annular visible surface 81a in each of the projected scales 40 and the annular portion 81 (at least the facing visible surface 81a in the facing 81) is preferably formed in the same color. For example, in accordance with the example, at least the annular visible surface 81a in the annular portion 81 and each of the projected scales 40 are the same dark color. The color of the annular visible surface 81a may be a color of a material itself or may be a color of an applied paint. Therefore, in the vehicle instrument device 1, when the light source is turned off, each of the projected scales 40 and the annular portion 81 are the same color when viewed from a viewer side. Accordingly, each of the projected scales 40 and the annular portion 81 are further integrated, and appearance is improved when the light source is turned off. On the other hand, in the case where further integration and appearance improvement are required when the light source is turned on, a color of the annular visible surface 81a in the annular portion 81 is at least set in accordance with the color of the projected scale 40 when the light source is turned on.

Furthermore, an annular member (ring member) 82 different from the latter case in the description of the annular portion 81 is provided at an outer peripheral edge of the annular portion (facing) 81 in the vehicle instrument device 1. The annular member 82 is molded by a polymer material such as a synthetic resin or a metal material such as aluminum and fixed to the outer peripheral edge of the annular portion (facing) 81 by using such as a double-sided adhesive tape (illustration omitted).

The annular member 82 covers the outer peripheral edge of the annular portion 81 from a front side and also includes an inner peripheral edge line coincide with the outer peripheral edge line of the annular visible surface 81a when viewed from a viewer side. The annular member 82 further includes an annular visible surface 82a, which can be visually recognized by a viewer from a front side, on the outer radial direction starting from the inner peripheral edge line. The annular visible surface 82a is formed as one annular inclined surface which is inclined in the same direction as the scale visible surface 41a and the annular visible surface 81a of the annular portion 81 (the facing visible surface 81a of the facing 81). Specifically, the annular visible surface 82a of the annular member 82 is, for example, an annular inclined surface in which the projection amount toward a front side from a front surface of the display board 30 decreases toward the inner radial direction. For example, on a basis of a plane orthogonal to the axial line direction, an angle of inclination of the annular visible surface 82a of the annular member 82 according to the example becomes smaller than that of the annular visible surface 81a of the annular portion 81 (the facing visible surface 81a of the facing 81).

In this manner, in the vehicle instrument device 1, in addition to the scale visible surface 41a of each of the projected scales 40 and the annular visible surface 81a of the annular portion 81 (the facing visible surface 81a of the facing 81), the annular visible surface 82a of the annular member 82 is inclined in the same direction. Therefore, in the case of providing the annular member 82 in the vehicle instrument device 1, each of the projected scales 40, the annular portion 81, and the annular member 82 are further integrated, and appearance is improved. Especially, in the vehicle instrument device 1, when viewed form a viewer side, the annular visible surface 81a of the annular portion 81 (the facing visible surface 81a of the facing 81) covers an outer radial direction portion of each projected scale 40 from a front side, and the annular visible surface 82a of the annular member 82 covers an outer peripheral edge of the annular portion 81 from a front side. Therefore, in the vehicle instrument device 1, when viewed from the viewer side, a boundary, a step, and a gap between the scale visible surface 41a of each projected scale 40 and the annular visible surface 81a are reduced as much as possible. In addition, a boundary, a step, and a gap between the annular visible surface 81a of the annular portion 81 and the annular visible surface 82a of the annular member 82 are reduced as much as possible. Therefore, each of the projected scales 40, the annular portion 81, and the annular member 82 are further integrated, and appearance can be further improved.

In the vehicle instrument device 1, each of the projected scales 40 and at least the annular visible surface 81a in the annular portion 81 (at least the facing visible surface 81a in the facing 81) are formed in the same color, and also at least the annular visible surface 82a in the annular member 82 may be formed in the same color as the color of such as each projected scale 40. Therefore, in the vehicle instrument device 1, when viewed from a viewer side, each projected scale 40, the annular portion 81, and the annular member 82 are the same color when the light source is turned off, and each projected scale 40, the annular portion 81, and the annular member 82 are further integrated, and appearance is improved when the light source is turned off. On the other hand, in the case of further integration and appearance improvement is required when the light source is turned on, a color of at least the annular visible surface 81a in the annular portion 81 and a color of at least the annular visible surface 82a in the annular member 82 are set in accordance with the color of the projected scale 40 when the light source is turned on. In this vehicle instrument device 1, a color of at least the annular visible surface 82a in the annular member 82 is set to a color which is a different type of color of at least each of the projected scales 40 and at least the annular visible surface 81a in the annular portion 81. Thus, merchantability can be also improved together with an improving effect on appearance by integration by inclining in the same direction.

Figure 6:
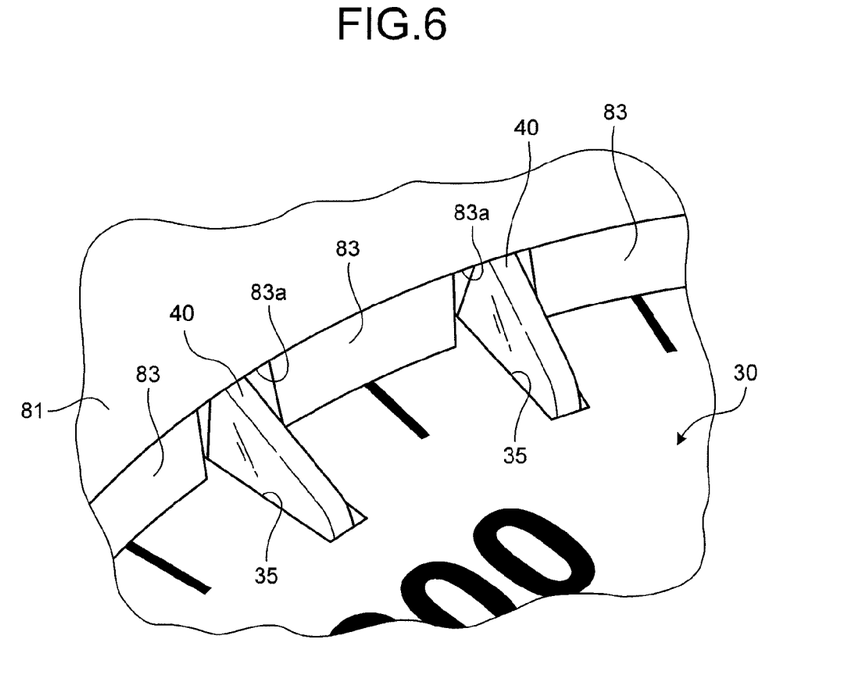
FIG. 6 is an enlarged perspective view of a periphery of a projected scale.

The annular portion (facing) 81 covers an outer radial direction portion of the projected end surface 41 of each of the projected scales 40 from a front side. Therefore, between adjacent projected scales 40 in a circumferential direction, there is a gap between an inner peripheral edge of the annular portion 81 and a front surface of the display board 30. Therefore, in the inner peripheral edge of the annular portion 81, a projected piece 83 is provided which is projected toward a front surface of the display board 30 between adjacent projected scales 40 in the circumferential direction (FIGS. 2 and 6). The projected piece 83 may be projected to the axial line direction so as to be arranged in a virtual space in which the annular portion 81 is projected in the axial line direction, and may be inclined in the same direction as the annular visible surface 81a of the annular portion 81 so as to project in the inner radial direction than the virtual space. In this example, in consideration of punching workability in the axial line direction from a molding of the annular portion 81 and appearance, the latter projected piece 83 is provided. Therefore, an angle of inclination of the projected piece 83 with respect to the axial line direction is minimized within a range not impairing the punching workability. Accordingly, deterioration in appearance can be prevented by the annular portion 81 while securing the punching workability.

Figure 7:
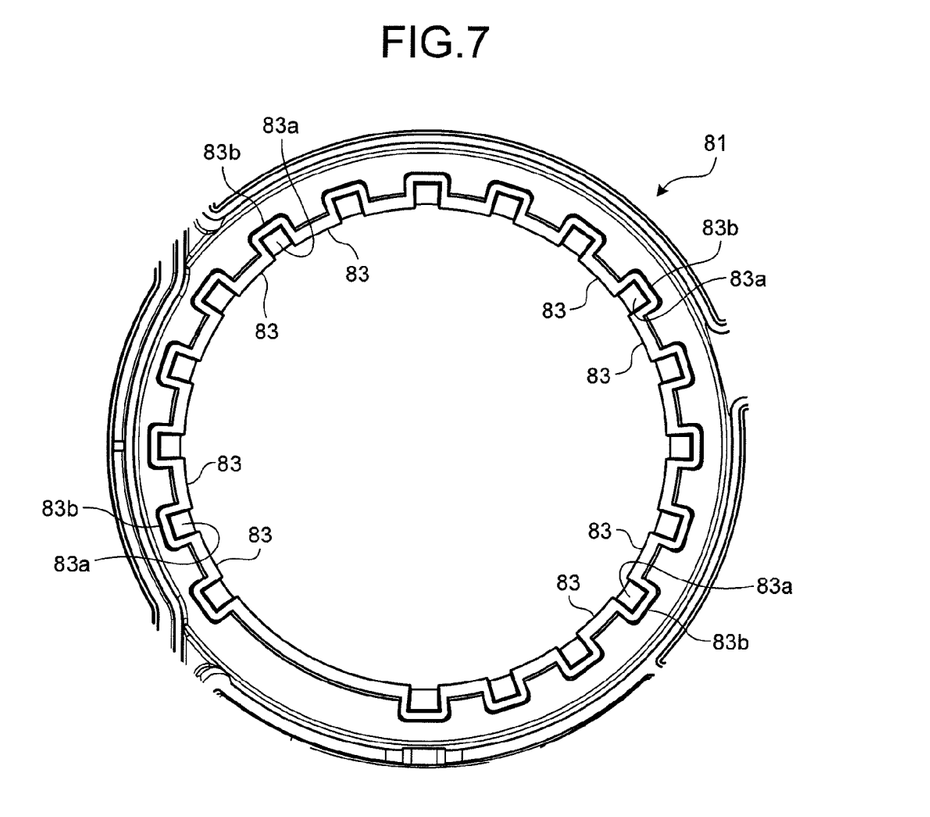
FIG. 7 is a view in which a facing is seen from a back side.
Figure 8:
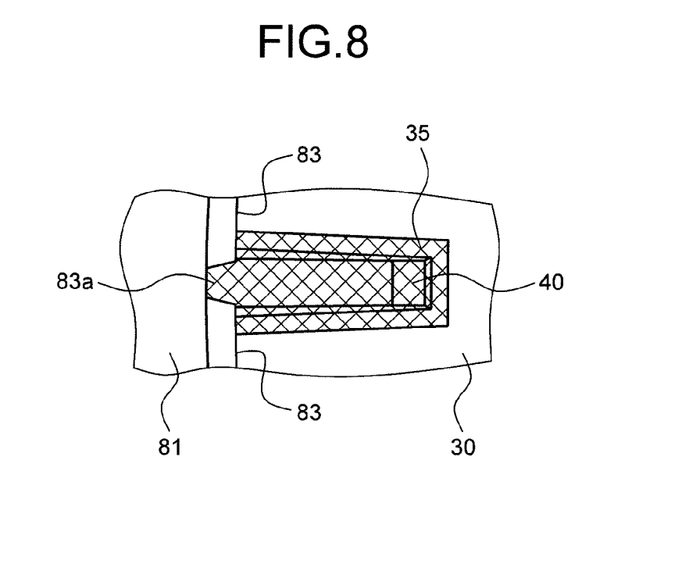
FIG. 8 is a reference view of an inappropriate lighting way of the projected scale.
Figure 9:
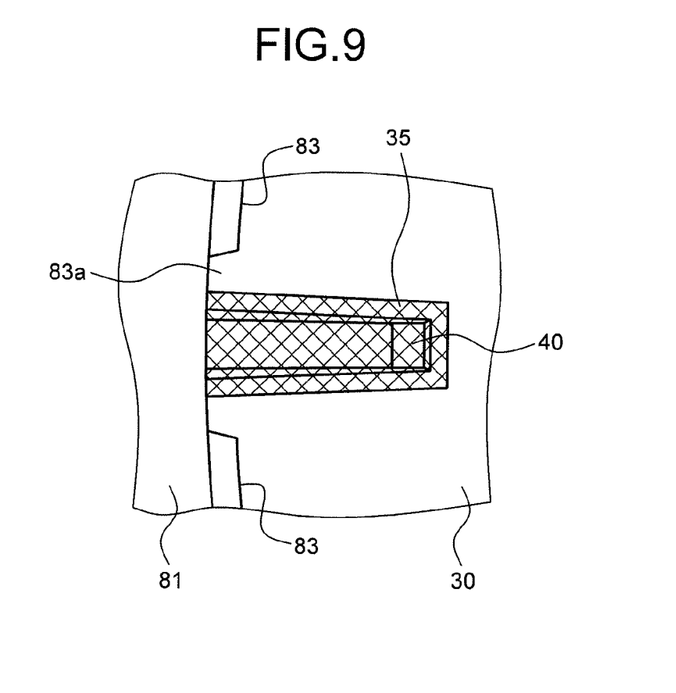
FIG. 9 is a view explaining an appropriate lighting way of the projected scale.

Between adjacent projected pieces 83 in a circumferential direction, a space is formed as a groove 83a to accommodate an outer radial direction portion of the projected scale 40. This annular portion (facing) 81 is an area for accommodating the outer radial direction portion of the projected scale 40, and the grooves 83a which is visible by a viewer from a viewing position side is included for each projected scale 40. The projected piece 83 is projected on an inner radial direction than the above-described virtual space in the groove 83a according to the example. Therefore, the groove 83a extends in an inner radial direction than an inner peripheral edge line of the annular visible surface 81a of the annular portion 81. In the example, as illustrated in FIG. 7, on a back side of the annular portion 81, a wall surface of the groove 83a is formed, and a connecting portion 83b which connects the projected pieces 83 adjacent in a circumferential direction each other is provided.

Here, an inner radial direction portion than an inner peripheral edge line of the annular visible surface 81a of the groove 83a can be slightly visible from a front side as illustrated in FIGS. 2 and 4. Therefore, in the case where a width (width in a circumferential direction) W2 of a visible inner radial direction portion of the groove 83a is smaller than a width (width in a circumferential direction) W1 of the insertion portion 35 of the projected scale 40 on the display board 30, the projected scale 40 does not look shining along its shape (specifically, a rectangular or trapezoidal shape) when the light source is turned on, and it looks shining in a state in which there is a step in accordance with the width W2 of the groove 83a on the outer radial direction portion (for example, a hatching portion in FIG. 8). Therefore, in this case, a viewer might have discomfort in the shape of the projected scale 40 when the light source is turned on, and also appearance deterioration might be caused. Further, even if the projected piece 83 is projected in an axial line direction so as to be arranged in the above-described virtual space, a viewer can slightly see the inner radial direction portion of the groove 83a from a front side. Therefore, a viewer might have discomfort when the light source is turned on as with the groove 83a extended in an inner radial direction than an inner peripheral edge line of the annular visible surface 81a. In this case, the groove 83a might cause appearance deterioration.

Therefore, the groove 83a is formed so that the width W2 of the visible portion (an inner radial direction portion) becomes larger than the width W1 of the insertion portion 35. As well as setting the widths W1 and W2, shapes of the insertion portion 35 and the projected scale 40 (specifically a form of the scale visible surface 41a) are coincide with each other except for a scale when viewed from a front side, and therefore, when the light source is turned on, for example, as illustrated in the hatching portion in FIG. 9, the projected scale 40 looks shining along its shape (rectangular or trapezoidal shape). Therefore, it is prevented in the vehicle instrument device 1 that a viewer has discomfort in a shape of the projected scale 40 and that appearance is impaired when the light source is turned on. Here, to form the groove 83a, the largest width in the insertion portions 35 arranged at a visible inner radial direction portion of the groove 83a in the case of being viewed from a front side is preferably applied to the width W1 of the insertion portion 35. Further, the smallest width in the visible inner radial direction portion of the groove 83a in the case of being viewed from a front side is preferably applied to the width W2 of the groove 83a.

As indicated above, the appearance of the vehicle instrument device 1 (instrument device) can be improved since the projected scale 40 looks shining along its shape when a viewer watches the instrument 10 from a viewer side while operating the lighting device 60.

Appearance of the instrument device according to the present invention can be improved since the projected scale is appeared to be illuminated along its shape when the instrument is viewed from a viewing position side while operating a lighting device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An instrument device comprising:
multiple projected scales configured to be indicated by an indicating needle which rotates in response to measurement results, wherein the projected scales are projected toward a viewing position side in an axial line direction of a rotation center axis of the indicating needle, and the projected scales are arranged at intervals in a circumferential direction around the rotation center axis;
a plate member comprising insertion portions configured to receive each of the projected scales such that each of the projected scales projects toward the viewing position side;
an annular portion configured to cover, from the viewing position side, an outer side portion in a radial direction of each of the projected scales; and
a lighting device configured to emit light to the projected scales;
projected pieces each provided between adjacent projected scales in the circumferential direction on an inner peripheral edge of the annular portion; and
grooves each provided between the adjacent projected pieces in the circumferential direction and configured to accommodate the outer side portion of each of the projected scales, the grooves being visible from the viewing position side,
wherein the projected scales include scale visible surfaces on an inner side in the radial direction, and
a visible portion of the grooves has a width in the circumferential direction that is equal to or larger than a width in the circumferential direction of the insertion portions.

2. The instrument device according to claim 1, wherein the annular portion has an inner peripheral edge line,
each scale visible surface has an outer peripheral edge line,
when viewed from a viewing position side, the outer peripheral edge line of each scale visible surface is coincides with the inner peripheral edge line of the annular portion,
each projected scale includes a connecting surface which is connected to the scale visible surface and located further away in an outer radial direction than the inner peripheral edge line of the annular portion, and
each connecting surface has a direction and an angle of inclination that are the same as those of corresponding scale visible surfaces.

3. The instrument device according to claim 1, wherein when viewed along the axial line direction, a shape of the insertion portion coincides with a shape of the projected scale.

4. The instrument device according to claim 2, wherein when viewed along the axial line direction, a shape of the insertion portion coincides with a shape of the projected scale.

* * * * *